Figure 1A:
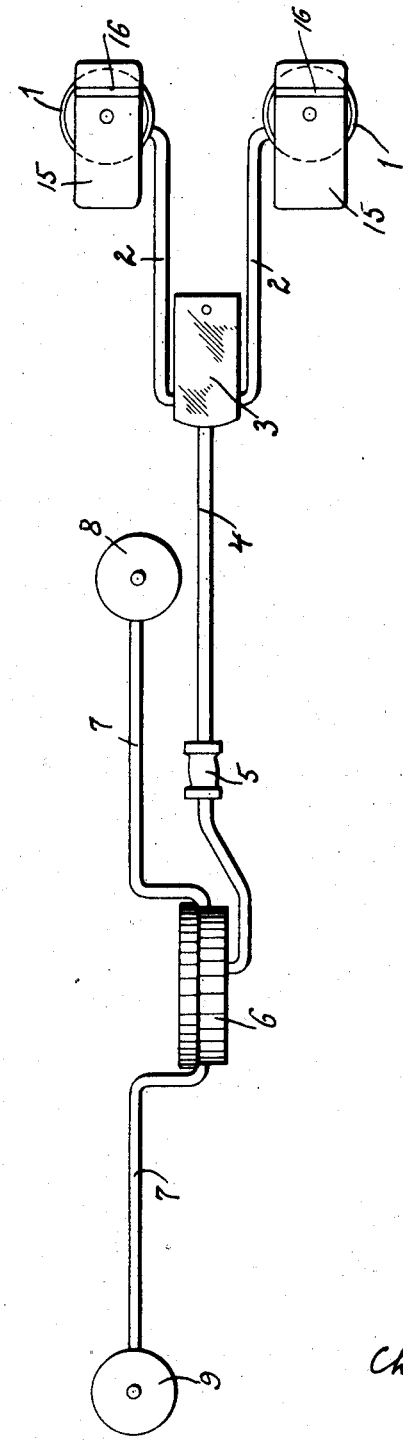

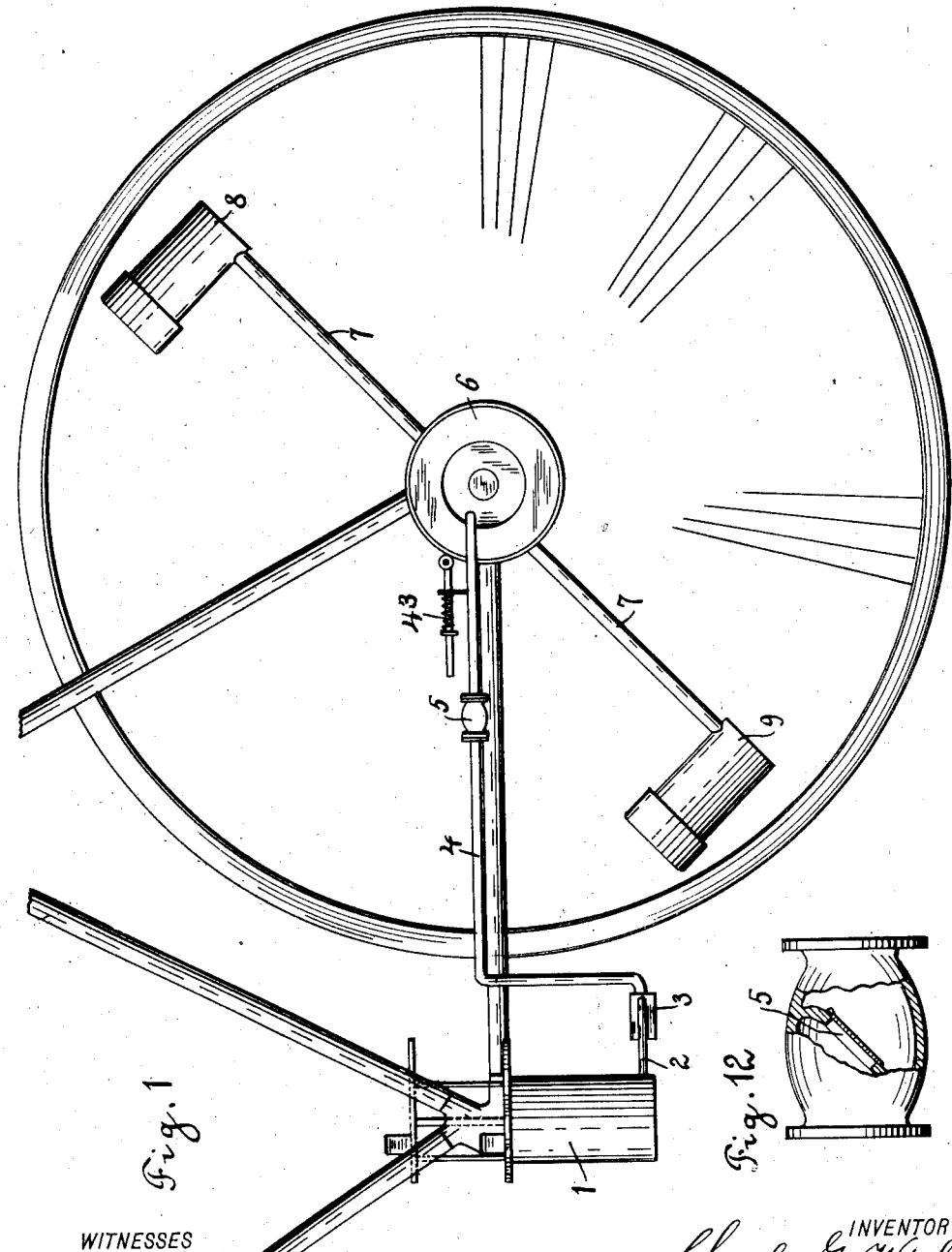

No. 879,227. PATENTED FEB. 18, 1908.
C. G. WIELAND.
PNEUMATIC MOTOR.
APPLICATION FILED AUG. 21, 1906.

4 SHEETS—SHEET 2.

WITNESSES
S. Birnbaum
Thos Leitch

INVENTOR
Charles G. Wieland
BY
Sigmund Herzog
his ATTORNEY

No. 879,227. PATENTED FEB. 18, 1908.
C. G. WIELAND.
PNEUMATIC MOTOR.
APPLICATION FILED AUG. 21, 1906.
4 SHEETS—SHEET 3.
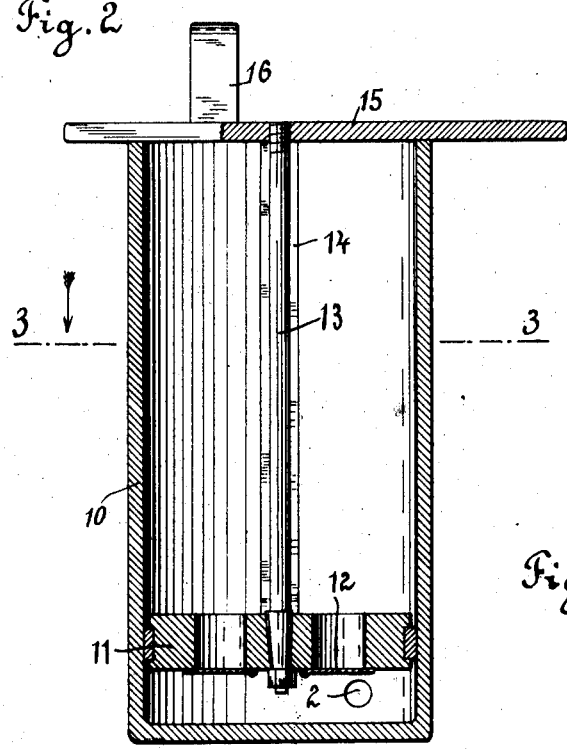
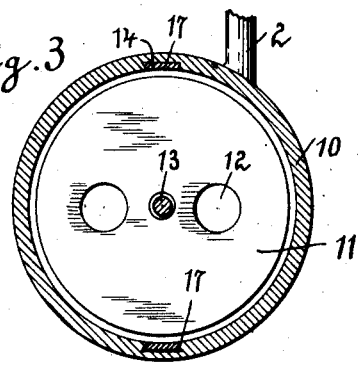
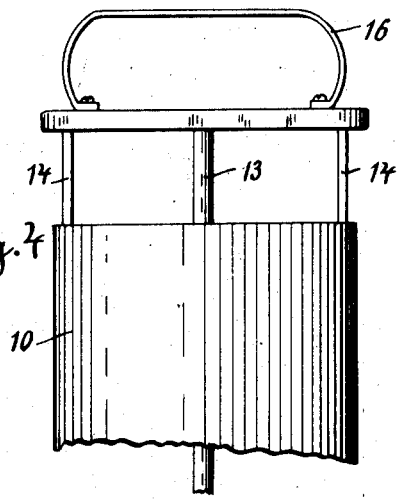
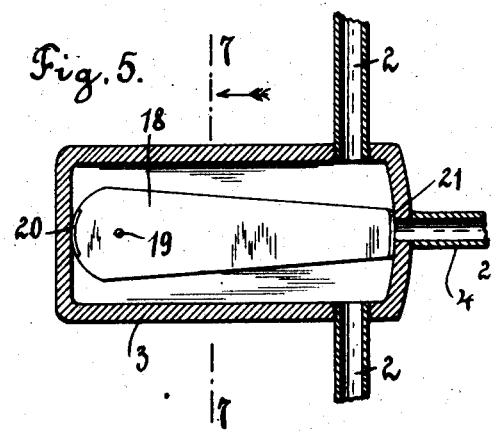
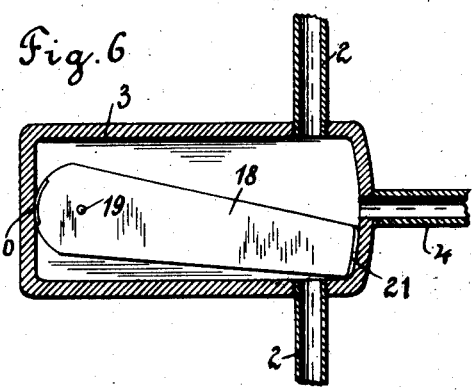
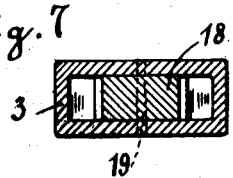
WITNESSES
INVENTOR
Charles G. Wieland
BY
Sigmund Herzog
his ATTORNEY No. 879,227. PATENTED FEB. 18, 1908.
C. G. WIELAND.
PNEUMATIC MOTOR.
APPLICATION FILED AUG. 21, 1906.
4 SHEETS—SHEET 4.
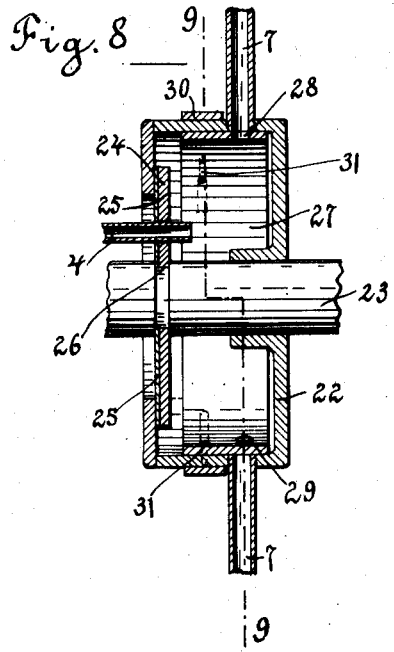
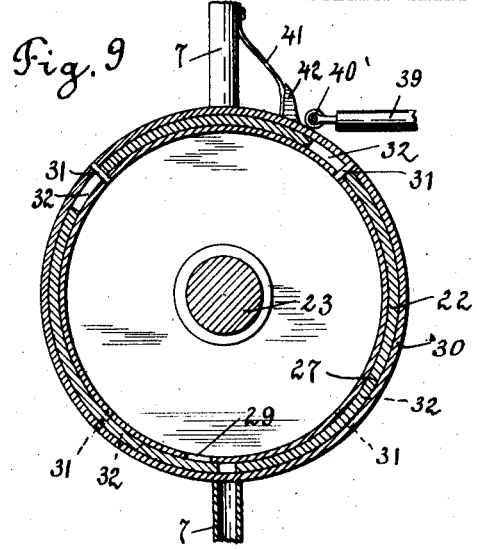
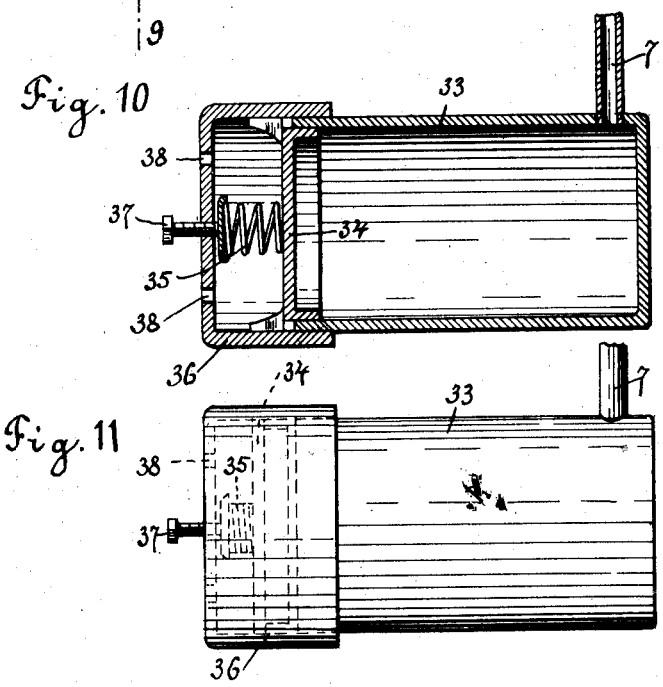
Charles G. Wieland
INVENTOR
WITNESSES
BY Sigmund Herzog
his ATTORNEY

UNITED STATES PATENT OFFICE.

CHARLES G. WIELAND OF HOBOKEN, NEW JERSEY.

PNEUMATIC MOTOR.

No. 879,227.    Specification of Letters Patent.    Patented Feb. 18, 1908.

Application filed August 21, 1906. Serial No. 331,478.

*To all whom it may concern:*

Be it known that I, CHARLES G. WIELAND, a citizen of the German Empire, and resident of Hoboken, in the county of Hudson and State of New Jersey, have invented certain new and useful Improvements in Pneumatic Motors, of which the following is a specification.

Vehicles of the bicycle or tricycle type have heretofore been propelled by hand, foot or motor power, and it is intended to supply by the present invention a modified form of motor driven vehicles, in which the driving power is represented by compressed air, while its mode of utilization is based upon the aeolopile or Hero's engine.

Compressed air is produced by footpower, using a pair of air compressors of simple and efficient construction, which are located on a bicycle in the place of the usual pedals. A number of conduits lead from the air compressors to a common valve, operated in such a way, that with the operation of the air compressors, the sliding member of the valve is displaced, causing alternate connection between the operating compressors and the collecting chamber. The latter is preferably located at the hub portion of the rear or driving wheel and connected again with one or more operating cylinders, located at the periphery of the driving wheel.

The compressed air, when stored in the collecting chamber and passing into the operating chambers, will, in time, overcome the resistance of the spring controlled cover and escape through the hood and its outlets into the open air, where it finds such resistance that it will cause the rotation of the driving wheel to which the operating cylinders are connected.

In the accompanying drawings, Figure 1 is a side view of a part of a bicycle, showing the complete device, Fig. 1ª is a diagrammatical plan view of the same, Fig. 2 is a vertical cross section through one of the air compressors, Fig. 3 is a horizontal cross section in the line 3—3 of Fig. 2, Fig. 4 is a side view of the upper end of an air compressor, Figs. 5 and 6 are horizontal cross sections of the valve, Fig. 7 is a vertical cross section in line 7—7 of Fig. 5. Fig. 8 is a vertical cross section in the axis of the collecting chamber, Fig. 9 is a vertical cross section in the line 9—9 of Fig. 8, Fig. 10 is a vertical cross section in the axis of an operating cylinder, Fig. 11 is a side view of the same, and Fig. 12 is a vertical cross section of the check valve.

In Fig. 1, illustrating the assembled invention, 1 is one of the air compressors, connected by a conduit 2 to the valve chamber 3, by a common conduit 4 to the check valve 5 and the collecting chamber 6. As shown in the drawings, the air compressors are preferably located at the usual junction of the bicycle frame, and the conduits as well as the valve chamber and check valve are placed along and supported by the horizontal strut of the frame. The collecting chamber 6 is arranged on the shaft of the driving wheel of the bicycle, the conduits 7, leading therefrom in a radial direction, may be connected to the spokes of the wheel, and the operating chambers 8 and 9 are located at or near the rim of the driving wheel. The open ends of the operating chambers are placed in opposite tangential direction in relation to the rim of the wheel, so that one operating chamber or set of chambers will cause the wheel to rotate one way, whereas the other chamber or set of chambers will cause it to rotate in the other or opposite direction.

Figs. 2, 3 and 4 illustrate the air compressors, of which there are two in number, one on each side of the frame of the bicycle and adapted to be operated by the left and right foot of the rider one foot rising when the other descends. Each compressor consists of a cylindrical casing 10, open at the upper end and containing a piston 11, having a series of valves 12, as well known in the art and used in air compressors of this general character. The piston is provided with a number of guide rods 14, carrying a platform 15, having a toe-holder or toe-clip 16. The foot of the rider rests on this plate and by its up and down movement compresses the air in the cylinder. The guides 14 slide in guide ways 17 on the inner wall of the cylinder. The guide rods 14 are not necessarily located within the cylinder, but may be outside of the same, or other suitable means may be provided to more securely support the platform 15.

The compressed air is led through the conduit 2 to the valve chamber 3, which consists of a rectangular box having its front end curved, and containing a sliding member 18, oscillating on a pivot 19 and preferably provided with packing 20 and 21. The upper and lower face of the sliding member ought to be well ground, so as to form perfect contact with the corresponding faces of the valve chamber. It is seen that when air is forced into the valve chamber from one side, it will cause the sliding member 18 to oscillate to the opposite side and open a path for the compressed air from the operating compressor through the conduit 4 and check valve 5, located therein, to the collecting chamber 6. The air, of course, cannot return on account of the check valve.

The collecting chamber 6, (Figs. 8 and 9) comprises a cylindrical casing 22, secured to the shaft 23 of the driving wheel. One of the two hub-portions of this casing is left off, and its place is taken by a stationary annular disk 24, secured to the frame of the wheel and containing an opening for the conduit 4.
It is obviously provided with suitable packings 25 and 26, so as to make the collecting chamber entirely airtight. An inner sleeve 27 is well fitted in the casing 22, and provided with ports 28 and 29, one of which only coincides at one time with one of the conduits 7 leading to the operating chambers. For the purpose of turning this sleeve an outer sleeve 30 is provided, having a series of pins 31, passing through corresponding, elongated openings 32 in the casing 22, and connecting the outer sleeve with the inner sleeve.

The operating chambers (Figs. 10 and 11) comprise a casing 33 of any suitable cross section, closed at one end, and covered at the open end with a lid 34, controlled by a helical spring 35, supported by a hood 36, secured to the casing 33, this spring is adjustable by a screw 37. The hood 36 is provided with one or more apertures 38.

As soon as the air pressure exceeds the outside pressure of the atmosphere, the compressed air in the collecting chamber will pass through one of the ports and the corresponding conduit to one of the operating chambers, lift the lid of the same and escape through the apertures in the hood into the open air, causing rotation of the wheel by reaction.
For the purpose of reversing the direction in which the wheel is driven or for braking the wheel, a device 43 is provided, comprising a rod 39 (Fig. 9), and a roller 40. When the roller 40 is forced in horizontal direction against the sleeve 30, which rotates normally with the casing 22, secured to the shaft 23, the roller will cause retardation of the rotation of the sleeve and a shifting of the same, so that the port coinciding at that moment with one of the conduits 7, will be removed from the latter, while the other port will be made to coincide with the other conduit, leading to the opposite operating chamber which, as already stated, sends its compressed air in a tangential direction opposite to the direction in which the compressed air of the first operating chamber escapes. For the purpose of returning the sleeve 30 to its normal position, a spring 41 is provided on one of the conduits, so that when the pressure of the roller 40 on the sleeve 30 is terminated, the pressure of the spring 41 on the shoulder 42, secured to said sleeve, will cause the same to return to its first position.

As new and useful is claimed and desired to be secured by Letters Patent of the United States:—

1. The combination with a vehicle, of a plurality of air compressors, a common valve chamber, a conduit leading from each of said compressors to said valve chamber, a collecting chamber, a conduit leading from said valve chamber to said collecting chamber, a plurality of operating chambers, each of them comprising a casing open at one end, a spring controlled cover for the open end of said casing and a hood surrounding said cover and having one or more outlets, and a conduit leading from said collecting chamber to each of said operating chambers.

2. The combination with a vehicle, of a plurality of air compressors, a common valve chamber, a conduit leading from each of said compressors to said valve chamber, a collecting chamber, a conduit leading from said valve chamber to said collecting chamber, a plurality of operating chambers located near to the rim of the vehicle-wheel, each of them comprising a casing open at one end and a spring controlled cover for the open end of said casing and a hood surrounding said cover and having one or more outlets, and a conduit leading from said collecting chamber to each of said operating chambers.

3. The combination with a vehicle, of a plurality of air compressors, a common valve chamber, a conduit leading from each of said compressors to said valve chamber, a collecting chamber, a conduit leading from said valve chamber to said collecting chamber, a check-valve in said conduit, a plurality of operating chambers located near to the rim of the vehicle wheel, each of them comprising a casing open at one end and a spring controlled cover for the open end of said casing and a hood surrounding said cover and having one or more outlets, and a conduit leading from said collecting chamber to each of said operating chambers.

4. An operating chamber, comprising a casing open at one end, a conduit leading into said casing, a spring-controlled cover for the open end of the casing, a hood surrounding said cover, and one or more outlets in said hood.

Signed at New York, in the county of New York and State of New York, this 13th day of August, A. D. 1906.

CHARLES G. WIELAND.

Witnesses:
RALPH J. SACHERS,
M. F. WOOD.